April 11, 1944. W. RUTHVEN 2,346,456
SELF-LOCKING NUT
Filed Jan. 14, 1943 2 Sheets-Sheet 1
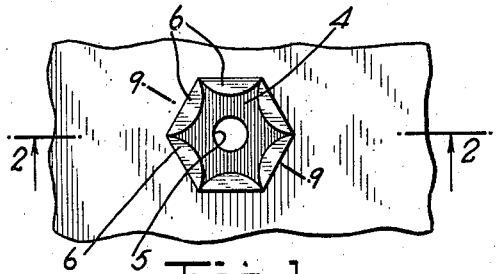
Fig.1.
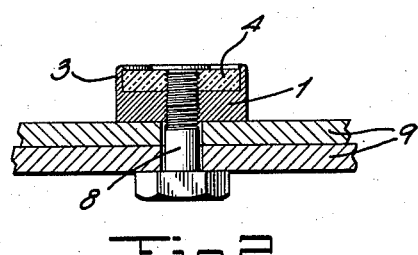
Fig.2.
Fig.3.
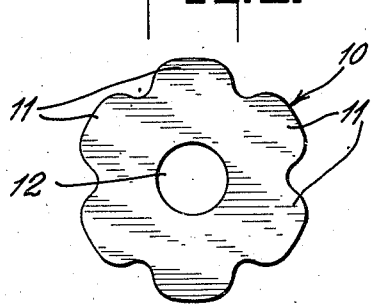
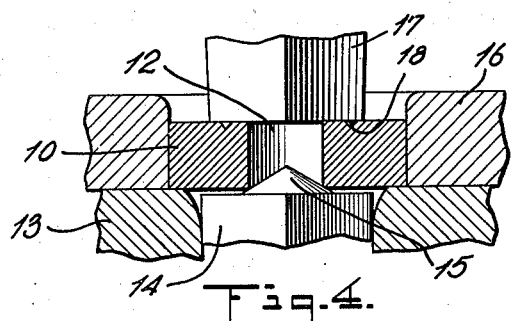
Fig.4.
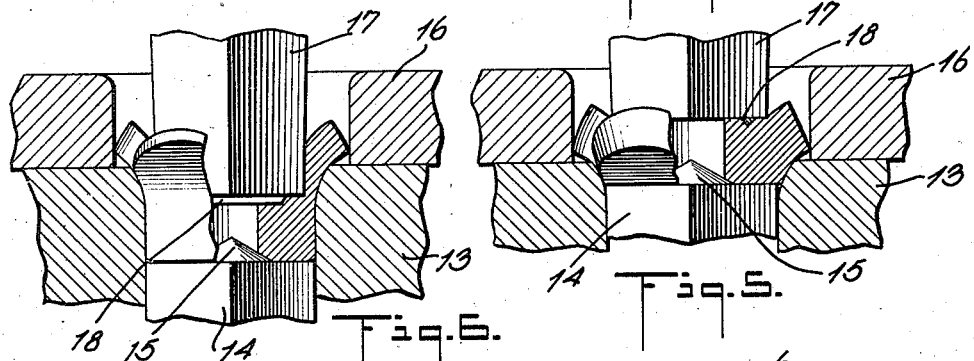
Fig.5. Fig.6.
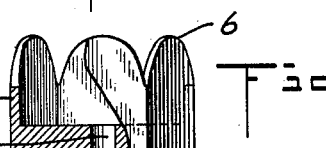
Fig.8. Fig.9.
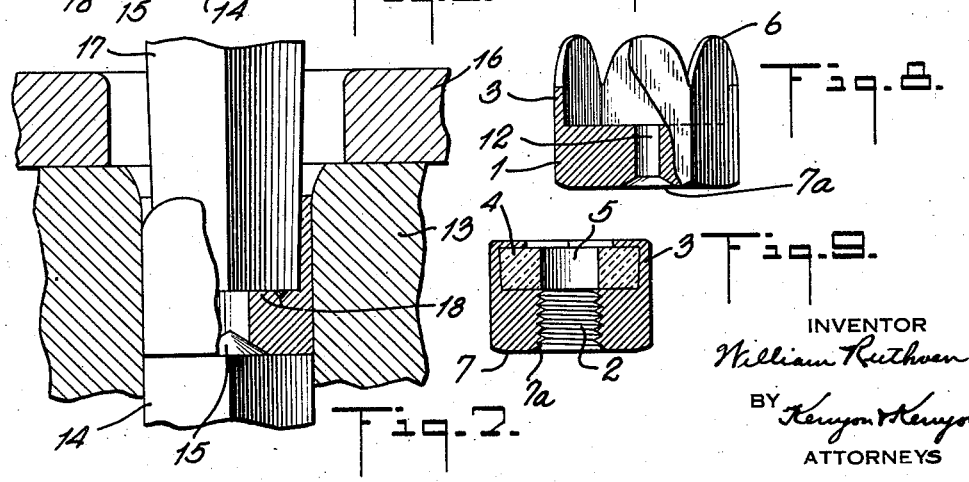
Fig.7.
INVENTOR
William Ruthven
BY Kenyon & Kenyon
ATTORNEYS

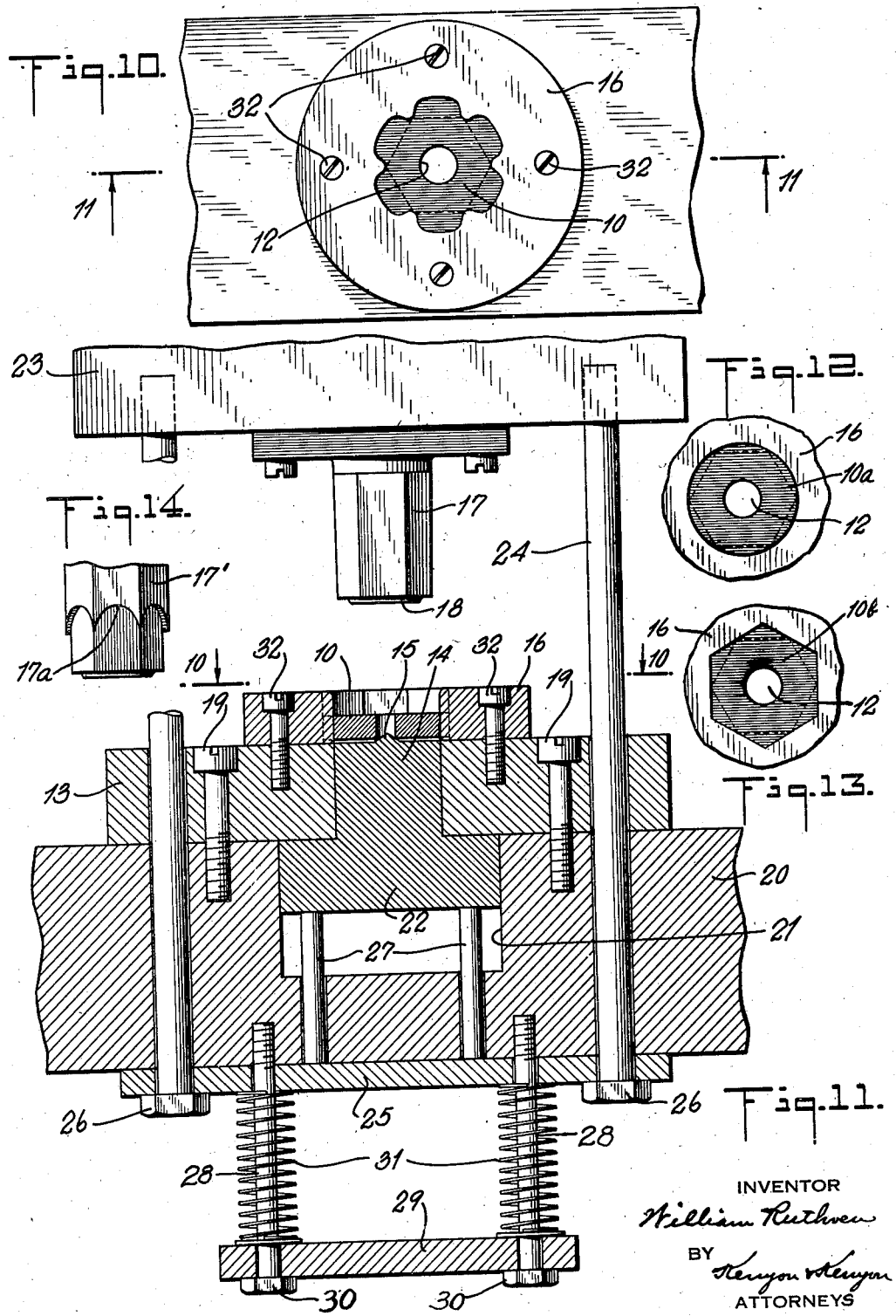

Patented Apr. 11, 1944

2,346,456

UNITED STATES PATENT OFFICE 2,346,456

SELF-LOCKING NUT

William Ruthven, Oak Park, Ill., assignor to Allied Control Company, Inc., New York, N. Y., a corporation of New York Application January 14, 1943, Serial No. 472,333

20 Claims. (Cl. 10—86)

This invention relates to self-locking nuts of the type including a resilient insert and to the manufacture of such nuts.

An object of this invention is an improved self-locking nut of the type in which a nut member is provided with a recess to receive a resilient locking member and prevent rotation of the locking member relative to the nut member.

An object of this invention is a self-locking nut formed from a metal blank and of integral construction except for the resilient insert.

A further object of this invention is a method of producing such a nut from a metal blank.

In the manufacture of the self-locking nut embodying this invention from a metal blank, pressure is applied to the metal blank to convert said blank by flow of the metal thereof into a polygonal shell having a bottom at least as thick as the original thickness of the blank and a wall of considerably less thickness than the original thickness of the blank. The socket of the shell is of polygonal configuration and into it is introduced a locking member which may be a perforated resilient insert of similar configuration, after which at least a portion of the edge of the shell wall is inturned over the insert to secure said member in the shell. The shell bottom is provided with a threaded bore to receive a bolt which extends therethrough into the aperture of the resilient insert with the threads of the bolt cooperating with the locking member to retain the bolt against accidental romoval from the nut. The blank may be of different shapes as the ultimate nut structure may be obtained from any one of a number of different shaped blanks by suitable design of the tools, by means of which the conversion of the blank into a shell is effected. Also, the conversion operation may be carried out in various types of presses or drawing apparatus.

In the production of a nut according to this invention, a metal blank preferably of substantially circular configuration with regular scallops in its periphery, is forced into a polygonal cross-section drawing die of the same cross-section as the desired exterior shape of the finished nut by means of a polygonal punch of the same cross-section as the desired interior shape of the nut socket. As the blank is forced into the die the central portion thereof or the part which is to become the nut bottom may be slightly thickened and the remainder is ironed to less thickness than the thickness of the original blank and converted into socket wall portions parallel to the die axis and of sufficient height to equal the thickness of the resilient insert later to be introduced into the socket. The metal of the scallops produces integral tapering tabs projecting from the rim of the socket wall, which tabs are formed simultaneously with the formation of the shell. After the introduction of the insert into the shell, the tabs are turned in over the insert to hold it in the socket. The base of each tab is co-extensive with the top edge of its corresponding wall portion and the taper of each tab is sufficient that when the tabs are turned in over the insert there is no interference between adjacent tabs. This arrangement provides a continuous clamping flange for the insert along the rim of the socket thereby securely retaining the insert in the socket and overcoming a defect in previous self-locking nuts in which the insert was insecurely held to such extent that the insertion of a bolt into the nut caused the insert to pop out of the shell. According to this invention, the shell, together with its wall portions equipped with tapering tabs is produced in a one-operation procedure, thereby reducing production and tool cost to the minimum.

Although so far, best results have been obtained from a substantially circular scalloped blank, blanks of other configuration may be used. However, in each instance, the metal of the blank generally corresponding to the metal of the scallops of the circular scalloped blank produces tapering tabs extending from the top edge of each wall portion. The shape of the tabs thus produced depends upon the configuration of the original blank as well as the design of the tools, by means of which the original blank is converted into a shell.

Other objects, novel features and advantages of this invention will become apparent from the following specification and the accompanying drawings, wherein:

Fig. 1 is a plan view of a self-locking nut embodying the invention with a bolt inserted and serving to hold together two plates;

Fig. 2 is a section on the line 2—2 of Fig. 1;

Fig. 3 is a plan view of one form of blank for use in producing a nut according to the invention;

Figs. 4, 5, 6 and 7 illustrate successive operations in one procedure of converting the blank into a shell according to this invention;

Fig. 8 is an elevation partly in section of the shell produced by the steps illustrated in Figs. 4 to 7;

Fig. 9 is a section of the completed nut taken substantially on the line 9—9 of Fig. 1;

Fig. 10 is a section substantially on the line 10—10 of Fig. 11;

Fig. 11 is a vertical section of an apparatus for effecting the conversion steps illustrated in Figs. 4 to 7;

Figs. 12 and 13 are views similar to Fig. 10 of modifications and

Fig. 14 is a fragmentary view similar to Fig. 11 of a modification.

As illustrated in Figs. 1, 2, 8 and 9, a nut embodying this invention comprises a polygonal metallic body or bottom 1 having a central threaded aperture 2 and a hexagonal socket composed of connected flat wall portions 3 integral with said bottom. A resilient insert 4 of complemental configuration to the socket is received therein and has an opening 5 therethrough alined with the axis of the thread of the aperture 2 and of a diameter less than the major diameter of the aperture thread. Each wall portion 3 has an integral arcuate extension or tab 6, the base of which is co-extensive with the top edge of the wall portion. The tabs 6 are bent inwardly over the insert to hold it in the socket and the taper of each tab is such that when folded in it does not interfere with the adjacent tab. Together the tabs provide a continuous clamping flange along the rim of the socket to retain the insert 4 securely in place and prevent ejection of the insert from the socket upon insertion of a bolt into the insert through the threaded aperture 2. In this nut, the end surface 7 constitutes the face of the nut. As shown in Fig. 2, a bolt 8 passes through two or more plates 9 or the like to be held together and is first entered into the bottom aperture 2, after which it passes through the bore 5 of the insert 4 in the surface of which it embosses its thread. The surface 7 thus constitutes the abutting face of the nut when the nut is drawn home. The resilient insert 4 is shown herein as being non-metallic but may be metallic.

A blank 10 from which the nut above described may be made is shown in Fig. 3 and is of generally circular configuration formed with scallops 11. Also, the blank is preferably provided with a central perforation 12. Blanks of other configuration, for example, a true circle may also be used but experience to date has proven the blank of Fig. 3 to be most satisfactory.

Figures 4 to 7 inclusive illustrate the preferred procedure of constructing a shell from a blank. In these figures, 13 designates a fixed die block formed with a flared mouth die of hexagonal configuration and of the same size as the exterior of the nut which is to be constructed and having its major diameter at least equal to the minor diameter of the blank 10. A pressure pad 14 is mounted in the die for movement axially thereof and is provided with supporting and operating means which will be later described. A spear 15 projects upwardly from the central portion of the pressure pad and is materially less in cross-section than the pad. A holder 16 having a central aperture or nest of the same size and shape as the blank 10 is provided for locating the blank on the block 13 coaxial of the die with the scallops 11 properly oriented with respect to the die. A hexagonal punch 17 is supported for reciprocation into and out of the die and means, later to be described, are provided for effecting reciprocation of the punch. The punch is smaller in size than the die and may be slightly tapered, the size of the punch corresponding to the interior size of the shell of the finished nut. On the lower end of the punch is provided a circular rib 18 of at least as great diameter as the maximum diameter of the spear 15.

After the blank 10 has been positioned as shown in Fig. 4 with the pressure pad 14 in raised position and the spear 15 projecting into the perforation 12, the punch 17 is moved downwardly into contact with the top surface of the blank and sufficient pressure is applied by the punch-reciprocating means to cause downward movement of the blank 10 and pressure pad 14 through the positions shown in Figs. 5 and 6 to the position shown in Fig. 7 in which the pressure pad is rigidly supported by means later to be described. During the downward travel of the punch 17, the blank 10 is subjected to a drawing operation as illustrated in Figs. 5 and 6. During the drawing operation, some of the metal of the blank is caused to flow centrally thereof slightly increasing the thickness of that portion of the blank which later becomes the bottom one of the shell. Also, in the case of some of the softer steels, the bottom of the blank tends to bow downwardly. In addition, the inward flow of metal contracts the perforation 12 thereby minimizing to some extent the tendency of the central portion of the blank to become thicker. The remainder of the blank is ironed to less thickness than the original blank to form the wall portions 3 with the metal in the scallops 11 being projected beyond the top edges of the wall portions 3 to form arcuate tabs 6. Upon arrival of the pressure pad 14 at the position shown in Fig. 7, the punch 17 exerts sufficient pressure to straighten out any bow that may have been formed on the under surface of the bottom portion 1 during the drawing operation. Although during the forming operation the perforation 12 decreases in size, the spear 15 remains fully projected into the underface of the blank or else is fully projected thereinto by the pressure applied to the blank by the punch after the pressure pad 14 has reached the lower limit of its travel.

In the progress of the blank through the flared open-end of the tube into the interior of the tube, the blank is progressively drawn from its original contour into a polygonal exterior contour and there is simultaneously formed a polygonal wall extending at right angles to the plane originally occupied by the blank. This action is accomplished by utilizing for the drawing operation a plunger of polygonal contour corresponding to the shape of the tube and whose maximum cross-sectional area is less than the minimum cross-sectional area of the tube. The polygonal wall thus formed is continuous and consists of a connected series of flat wall portions extending at right angles to the original position of the blank and defining a polygonal space while each wall portion is formed with an arcuate extension at its outer edge. The bottom is at least as thick as the thickness of the original blank while the wall portions are of considerably less thickness.

The shell produced by the procedure just described is illustrated in Fig. 8. The perforation 12 in the bottom is of considerably less diameter than that required for the threaded aperture of the completed nut and terminates in a countersink 7a of slightly larger maximum diameter than the threaded aperture in the completed nut. The bottom 1 is next punched and tapped to provide the threaded aperture 2 which constitutes a continuation of the countersink 7a. The assembly of the nut is completed by introducing the insert 4 into the socket and turning the tabs 6 inwardly over the insert to secure it in the socket.

In Figs. 10 and 11, apparatus is illustrated for effecting the conversion procedure above described. The die block 13 is attached by bolts 19 to a frame 20 of a press and the frame is provided with a recess 21. The pressure pad 14 has a head 22 arranged in the recess 21 and the bottom of the recess 21 acts as an abutment to limit downward movement of the pressure pad. The punch 17 is supported by the head 23 of the press and rods 24 extend downwardly from the head 23 through the die block 13 and frame 20. A plate 25 underlies the frame 20 and has apertures through which extend the rods 24, each of which is equipped with a nut 26 bearing against the underface of the plate 25. A pair of rods 27 are slidably mounted in the frame 20 with their upper ends engaging the bottom face of the head 22 and their lower ends engaging the upper face of the plate 25. A pair of rods 28 are carried by the frame 20 and pass through apertures in the plate 25 as well as through apertures in a cross bar 29, each rod 28 being equipped with a head 30 which supports the bar 29. A spring 31 surrounds each rod 28 and is interposed between the plate 25 and bar 29. In the position shown in Fig. 11, the springs 31 are under merely enough tension to hold the pressure pad 22 in its upper position. The nest 16 is attached to the die block by bolts 32 and is oriented with respect to the die as shown in Fig. 10 so as to line up the scallops 12 with the flat faces of the die.

In the operation of this device, the punch 17 moves downwardly thereby contacting the rib 18 with the top surface of the blank 10, the bottom surface of which is engaged by the pressure pad 14 and the springs 31 are compressed to oppose downward movement of the pad. Continued downward movement of the punch 17 forces the blank 10 and pressure pad 14 together with the rod 27 and plate 25 downwardly against the pressure of the springs 31. After completion of its downward stroke, the punch 17 returns to its uppermost position leaving the formed shell at the bottom of the die. The shell is retained at the bottom of the die due to the fact that there is a greater area of contact between the outer surface of the shell and the surface of the die than between the inner surface of the shell and the surface of the punch and consequently the friction between the die and shell exceeds the pressure between the die and punch. Also, the friction between the shell and die is sufficient to retain the shell at the bottom of the die despite the upward pressure exerted on the head 22 by the springs 30. However, as the punch nears the upper end of its stroke, the nuts 26 engage the plate 25 to lift it upwardly, thereby lifting up the pressure pad 22 and ejecting the socket from the die.

During movement of the punch and blank into the die, the spear 15 acts as a pilot to prevent any lateral movement of the blank thereby insuring even drawing of the blank and uniformity in the wall portions 3 as well as in the tabs 6. The circular rib 18 also assists in clamping the blank 10 against lateral movement during the drawing operation. The spear and rib thus cooperate to assure uniform drawing although as a practical matter the spear 15 is completely efficient as a pilot. The springs 31 oppose downward movement of the pad 14 and supplies clamping pressure between the pad and the punch.

With some of the harder steels, the bowing action previously referred to may be absent so that the pressure pad does not have the function of providing a flat compact face. However, with such metal as well as with the softer metal, the pressure pad in combination with the spear 15 provides a countersink in the contact face thereby eliminating a countersinking operation after the removal of the shell from the press.

By the procedure just described, the blank is converted by a single operation into a shell having the wall portions thereof provided with integral tabs suitable for holding a resilient insert in the shell. After the conversion operation, it is necessary only to provide the threaded central aperture, introduce the resilient insert and turn over the tabs to form a complete nut.

A nut may be made according to this invention from a true circle blank. In construction such a nut, the same procedure and apparatus will be used except that the nest 16 will be of circular configuration. Also, the tabs 6 will be of slightly different configuration due to the difference in available metal. However, the shape of the tabs may also be varied by suitably designing the punch and die as well as by utilizing blanks of different configuration. Also, with certain types of metal, the blank may be imperforate, in which event the shell will be pierced for the first time after its completion.

A further form of blank which may be used to produce the nut of this invention is a hexagonal one. In the construction of the shell from a hexagonal blank, the blank is oriented with respect to the die so that each corner of the blank lies midway between two corners of the die. The corner portions of the blank are converted into the tabs 6 of the shell. The procedure of converting the blank into the shell is the same as previously described and use is made of the same apparatus except that the nest is of hexagonal configuration and is properly oriented to line up the blank in proper relation to the die.

Other forms of blanks which are symmetrical with respect to a point and so are generally circular but with regular indentations in the periphery may be used to produce the nut of this invention by the procedure herein described.

Fig. 12 illustrates a circular blank 10a arranged in the nest 16 above the hexagonal die in position to be converted into a shell by being forced into the die by the punch 17. Fig. 13 illustrates a hexagonal blank 10b arranged in the nest 16 above the hexagonal die with the blank so arranged that its corners lie midway between the corners of the die. The blank 10b is ready to be forced into the die to convert the blank into a shell. The material in the blank extending beyond the faces of the die produces the tabs 6.

While in the usual practice of the procedure herein disclosed the blank is processed cold, it is to be noted that if the blank is composed of metal of greater than usual hardness, the blank may be preheated to render it more workable. However, the procedure of converting the blank into a shell is the same irrespective of whether the blank is processed cold or hot.

The tabs 6 are herein disclosed as being of substantially arcuate configuration but it is to be understood that they may be of any other configuration in which the base of the tab is substantially co-extensive with the top edge of the associated wall portion and the tab decreases in thickness away from such top edge. In the claims, this configuration of tab is defined as tapered.

By properly regulating the extent of the advance of the punch into the die with relation to the original thickness of the blank, the operation performed on the blank may combine extrusion of the metal of the blank as well as drawing of such metal to produce the shell as above described. In such operation, metal is caused to flow by the application of pressure to the blank from the body portion up into the wall portions, The one-operation procedure may, therefore, be a combination of drawing and extrusion.

With some forms of blank or some types of metal, closer regulation of the metal forming the tabs 6 may be required. For this purpose, the punch 17' may be enlarged as shown in Fig. 14 to provide a shoulder 17a, the lower face of which has the same contour as the desired contour of the tabs 6. This arrangement completely confines the metal flowing into the tabs and definitely avoids the possibility of any feather-edge at the top of the tabs which might have to be removed by a trimming or clipping operation.

It is of course understood that various modifications may be made in the procedure and apparatus above described without in any way departing from the spirit of the invention as defined in the appended claims.

I claim:

1. A self-locking nut comprising a solid polygonal base having a central threaded aperture, integral wall portions of less thickness than the base projecting therefrom in a direction parallel to the aperture axis and defining a polygonal socket having a continuous plane surface bottom except for said aperture and a continuous wall, each wall portion terminating in a tapering integral tab the base of which is co-extensive with the top edge of the corresponding wall portion, and a perforated locking member in said socket of complementary shape and size to said socket to prevent relative rotation of said socket and member, each tab being inturned over said member without interference with an adjacent tab and providing a substantially continuous clamping flange for said member along the rim of said socket to retain the member in the socket.

2. A lock nut comprising a solid polygonal body having a concentric threaded hole and co-extensive integral side walls of like shape terminating in a series of scalloped lugs and defining with the adjacent edge of said body a polygonal socket having a continuous plane surface bottom except for said hole, and a locking member complemental to the shape of said socket fitted into said socket, the scalloped lugs of said side walls being formed in against the outer face of said member for permanent assembly.

3. A lock-nut of the kind in which an elastic, locking member is utilized to effect the locking action, which lock-nut comprises in combination a solid metallic body having the load-carrying thread therein and one end surface thereof forming the face of the nut, a socket at the opposite end of the nut body of polygonal configuration and having a continuous plane surface bottom except for said thread, and an elastic locking member of a polygonal configuration complementary to the socket within the socket and having an opening therethrough alined with the axis of the thread of the nut body and of a diameter less than the major diameter of the thread of the nut body, the end portion of the socket extending inwardly over and engaging the surface of the locking member and constituting a substantially continuous flange for retaining the locking member against axial movement with respect to the nut body upon the insertion of a bolt through the nut body into the locking member.

4. A lock-nut of the kind in which a resilient insert is utilized to effect the locking action, which lock-nut comprises in combination a solid metallic body having the load-carrying thread therein and one end surface thereof forming the face of the nut, a socket at the opposite end of the nut body of polygonal configuration and having a continuous plane surface bottom except for said thread, the wall of which terminates in a series of tapering end portions, and a resilient insert of a polygonal configuration complementary to the socket within the socket and having an opening therethrough alined with the axis of the thread of the nut body and of a diameter less than the major diameter of the thread of the nut body, the tapered end portions of the wall of the socket extending inwardly over and engaging the surface of the insert and constituting a substantially continuous flange for retaining the insert against axial movement with respect to the nut body upon the insertion of a bolt through the nut body and into the insert.

5. The method of forming a lock-nut from a metal blank which comprises locating the blank over the end of a polygonal die of less maximum cross-section than said blank, pressing against the blank a polygonal punch of less cross-section than said die to force said blank into the die without material change in shape of the blank within the area corresponding to the end of said punch and convert the blank into a polygonal shell having a bottom of approximately the same cross-section as the corresponding portion of the blank and a continuous wall of less thickness than the original thickness of the blank comprising a connected series of flat wall portions extending at right angles to the plane of the bottom with each wall portion having a tapered tab extending from its top edge and surrounding and defining a polygonal space, providing a central threaded aperture in said bottom, introducing into said space a locking member whose shape is complementary to that defined by said wall and bending said tabs into contact with said locking member to secure it in said space.

6. The method according to claim 5 characterized by the blank being of generally circular configuration formed with scallops.

7. The method according to claim 5 characterized by said blank being of circular configuration.

8. The method according to claim 5 characterized by the fact that as the blank is forced into the die its external size is progressively decreased during at least a part of said forcing.

9. The method of forming a lock-nut from a metal blank which comprises locating the blank over the end of a polygonal die of less maximum cross-section than that of the blank, pressing against the blank a polygonal punch of less cross-section than said die to force the blank into the die into contact with a fixed abutment without material change in shape of the blank within the area corresponding to the end of said punch, thereby converting the blank into a polygonal shell having a bottom of approximately the same cross-section as the corresponding portion of the blank and a continuous wall of less thickness than the original thickness of the blank comprising a connected series of flat wall portions extending at right angles to the plane of the bottom with each wall portion having a tapered tab extending from its top edge and surrounding and defining a polygonal space, providing a central threaded aperture in said bottom, introducing into said space a locking member whose shape is complementary to that defined by said wall and bending said tabs into contact with said locking member to secure it in said space.

10. The method according to claim 9 characterized by the blank being of generally circular configuration formed with scallops.

11. The method according to claim 9 characterized by said blank being of circular configuration.

12. The process of forming a lock-nut which comprises positioning a flat metal blank of suitable configuration over the flared end of a polygonal die whose minimum internal cross-section is less than that of the blank, progressively drawing said blank to a polygonal exterior contour by forcing it at least to the point of minimum cross-section of said die without material change in shape of the blank within the area corresponding to the end of said punch and simultaneously forming a polygonal wall extending at right angles to the plane originally occupied by the blank with each wall portion having a tapered extension at its outer edge by utilizing for the drawing operation a punch of polygonal contour corresponding to the polygonal shape of the die and whose maximum cross-section is less than the minimum cross-section of the die, providing a threaded aperture in the formed blank, inserting a perforated elastic insert of a shape complementary to that of said polygonal wall within the space defined thereby and bending said tabs into engagement with said insert.

13. The method of forming a lock-nut from a recessed metal blank which comprises locating the blank over the end of a polygonal die of less maximum cross-section than said blank, pressing against the blank a polygonal punch of less cross-section than said die without material change in shape of the blank within the area corresponding to the end of said punch to force said blank into the die and convert the blank into a polygonal shell having a bottom of approximately the same cross-section as the corresponding portion of the blank and a continuous wall of less thickness than the original thickness of the blank comprising a connected series of flat wall portions extending at right angles to the plane of the bottom with each wall portion having a tapered tab extending from its top edge and said wall surrounding and defining a polygonal space, prior to the application of force on said blank inserting into the blank recess a member movable with said punch to pilot the blank during its movement into the die, converting the blank recess into a central threaded aperture in the shell bottom, introducing into said space a perforated elastic insert whose shape is complementary to that defined by said wall and bending said tabs into contact with said insert to secure it in said space.

14. The method of forming a lock-nut from a recessed metal blank which comprises locating the blank over the end of a polygonal die of less maximum cross-section than that of the blank, pressing against the blank a polygonal punch of less cross-section than said die to force the blank into the die into contact with a fixed abutment without material change in shape of the blank within the area corresponding to the end of said punch, thereby converting the blank into a polygonal shell having a bottom of approximately the same cross-section as the corresponding portion of the blank and a continuous wall of less thickness than the original thickness of the blank comprising a connected series of flat wall portions extending at right angles to the plane of the bottom with each wall portion having a tapered tab extending from its top edge and said wall surrounding and defining a polygonal space, prior to the application of force on said blank inserting into the blank recess a member movable with said punch to pilot the blank during its movement into the die, converting the blank recess into a central threaded aperture in the shell bottom, introducing into said space a perforated elastic insert whose shape is complementary to that defined by said wall and bending said tabs into contact with said insert to secure it in said space.

15. The method of forming a lock-nut from a metal blank which comprises locating the blank over the end of a polygonal die of less maximum cross-section than that of the blank, pressing against the blank a polygonal punch of less cross-section than said die to force said blank into the die without material change in shape of the blank within an area corresponding to the end of said punch and convert the blank into a polygonal shell having a bottom of approximately the same cross-section as the corresponding portion of the blank and a continuous wall of less thickness than the original thickness of the blank comprising a connected series of flat wall portions extending at right angles to the plane of the bottom with each wall portion having a tapered tab extending from its top edge and said wall surrounding and defining the polygonal space, maintaining said blank against lateral movement during insertion into said die, providing a central threaded aperture in said bottom, introducing into said space a perforated elastic insert whose shape is complementary to that defined by said wall and bending said tabs into contact with said insert to secure it in said space.

16. The method according to claim 15 characterized by the blank being forced by the punch into contact with a fixed abutment.

17. The method according to claim 15 characterized by the blank having a central recess and said recess being converted into the central threaded aperture in the shell bottom after the formation of the shell.

18. The method according to claim 15 characterized by the blank having a central perforation and said perforation being converted into the central threaded aperture in the shell bottom after the formation of the shell.

19. The method according to claim 5 characterized by said blank being of polygonal cross section and being oriented to locate each corner midway between two corners of the die.

20. In the procedure of producing a lock-nut from a metal blank, the step which comprises locating the blank over the end of a polygonal die of less maximum cross-section than said blank, pressing against the blank a polygonal punch of less cross-section than said die to force said blank into the die without material change in shape of the blank within the area corresponding to the end of said punch and convert the blank into a polygonal shell having a bottom of approximately the same cross-section as the corresponding portion of the blank and a continuous wall of less thickness than the original thickness of the blank comprising a connected series of flat wall portions extending at right angles to the plane of the bottom with each wall portion having a tapered tab extending from its top edge and surrounding and defining a polygonal space, and providing a central threaded aperture in said bottom.

WILLIAM RUTHVEN.

CERTIFICATE OF CORRECTION.

Patent No. 2,346,456.　　　　　　　　　　　　　　April 11, 1944.

WILLIAM RUTHVEN.

It is hereby certified that error appears in the printed specification of the above numbered patent requiring correction as follows: Page 5, second column, line 47-48, claim 18, for "central perforation" read --central recess--; line 48, for "perforation" read --recess--; and that the said Letters Patent should be read with this correction therein that the same may conform to the record of the case in the Patent Office.

Signed and sealed this 30th day of May, A. D. 1944.

Leslie Frazer

(Seal)　　　　　　　　　　　　　　Acting Commissioner of Patents.